United States Patent
Bass

(10) Patent No.: US 7,635,145 B2
(45) Date of Patent: Dec. 22, 2009

(54) MOTOR VEHICLE AIR BAG AND FABRIC FOR USE IN SAME

(75) Inventor: Claire B. Bass, Spartanburg, SC (US)

(73) Assignee: Safety Components Fabric Technologies, Inc., Greenvile, SC (US)

( * ) Notice: Subject to any disclaimer, the term of this patent is extended or adjusted under 35 U.S.C. 154(b) by 0 days.

(21) Appl. No.: 10/806,082

(22) Filed: Mar. 22, 2004

(65) Prior Publication Data

US 2004/0242098 A1    Dec. 2, 2004

Related U.S. Application Data

(60) Provisional application No. 60/456,653, filed on Mar. 21, 2003.

(51) Int. Cl.
*B60R 21/16* (2006.01)

(52) U.S. Cl. .................................. 280/728.1; 427/387

(58) Field of Classification Search ................ 118/400, 118/404; 427/387, 394, 412, 430.1; 280/728.1; 428/34.1, 34.3, 34.5, 34.7, 36.1; 442/59, 442/63, 104, 164, 189
See application file for complete search history.

(56) References Cited

U.S. PATENT DOCUMENTS

| | | | |
|---|---|---|---|
| 3,892,425 A | 7/1975 | Sakairi et al. | |
| 4,052,158 A * | 10/1977 | Weil | 8/115.63 |
| 4,921,735 A | 5/1990 | Bloch | |
| 5,110,666 A | 5/1992 | Menzel et al. | |
| 5,131,434 A | 7/1992 | Krummheuer et al. | |
| 5,296,278 A | 3/1994 | Nishimura et al. | |
| 5,356,680 A | 10/1994 | Krummheuer et al. | |
| 5,581,856 A | 12/1996 | Krummheuer et al. | |
| 5,945,186 A | 8/1999 | Li et al. | |
| 5,989,660 A * | 11/1999 | Moriwaki et al. | 428/35.2 |
| 6,169,043 B1 | 1/2001 | Li | |
| 6,239,046 B1 | 5/2001 | Veiga | |
| 6,429,155 B1 | 8/2002 | Li et al. | |
| 6,451,715 B2 | 9/2002 | Li et al. | |
| 6,491,980 B1 * | 12/2002 | Muller et al. | 427/387 |
| 6,585,293 B2 | 7/2003 | Keshavaraj | |
| 6,607,797 B1 | 8/2003 | Ritter | |
| 6,698,458 B1 | 3/2004 | Sollars, Jr. et al. | |
| 6,713,131 B2 * | 3/2004 | Blackwood et al. | 427/387 |
| 6,734,124 B2 | 5/2004 | Hurst et al. | |
| 6,734,125 B2 | 5/2004 | Veiga | |
| 6,815,069 B2 | 11/2004 | Hohberg et al. | |
| 2002/0033589 A1 | 3/2002 | Barnes | |
| 2002/0145276 A1 | 10/2002 | Veiga | |

FOREIGN PATENT DOCUMENTS

GB    2265122    9/1993

OTHER PUBLICATIONS

International Search Report dated Mar. 8, 2005 for corresponding PCT Application No. PCT/US2004/08869, international filing date Mar. 22, 2004.

* cited by examiner

*Primary Examiner*—Arti Singh-Pandey
(74) *Attorney, Agent, or Firm*—Dority & Manning, P.A.

(57) ABSTRACT

A vehicle air bag for use with an on-board inflator mechanism. The air bag is formed from a base fabric that has been dipped in an aqueous solution. As a result, a finish is applied to the base fabric to achieve a desired low permeability.

27 Claims, 3 Drawing Sheets

MOTOR VEHICLE AIR BAG AND FABRIC FOR USE IN SAME

PRIORITY CLAIM

This application claims priority to Provisional Application No. 60/456,653, filed Mar. 21, 2003, which is hereby incorporated by reference.

BACKGROUND OF THE INVENTION

The present invention relates generally to air bags of the type utilized in vehicle occupant restraint systems.

Motor vehicles commonly employ air bag systems to supplement the protection provided by seatbelts. These air bag systems use at least one folded air bag in fluid communication with a source of inflation gas. When a collision is detected, a sensor within the vehicle actuates the source of inflation gas. Typically, a chemical reaction generates the inflation gas needed to inflate the air bag. Consequently, the air bag rapidly expands to absorb at least a portion of the collision force that would otherwise have been imparted to the vehicle occupant.

Motor vehicles often contain several air bags, with each air bag positioned in an area of vulnerability for the vehicle occupants. The steering wheel generally contains a driver's side air bag to protect the driver. To protect an occupant located in the front passenger seat, the dash usually houses a passenger side air bag. In addition to driver side and passenger side air bags, many vehicles are now being equipped with side curtains.

Coated air bag fabrics were originally used for the driver's side air bags to inhibit the penetration of hot gases and particulate through the surface of the cushion. These air bags consisted primarily of neoprene rubber coated 840-denier, 25×25 construction nylon fabrics. The coating weight was typically about 2 ounces per square yard. Accordingly, these fabrics were very heavy and not easily packed into the small modules which contain the air bag system.

During the 1980's, the neoprene coated 840-denier fabrics were eventually phased out and replaced with a lighter weight silicone coated 420-denier 49×49 or 46×46 construction fabric. The silicone currently in production in the U.S. is either wholly solids with no solvents, or may contain some solvents which are burned off in ovens after the coating is applied. Regardless of the chemistry, silicone is typically applied in a knife over roll application on one side of the fabric, followed by heated ovens that are required for curing.

With the inception of side curtain air bags, air-holding requirements have forced fabric suppliers to look at lamination as a means for meeting the new specifications. Side curtains differ from frontal air bags in that they must hold air for long periods to protect the occupants during a rollover event. Although silicone-coated bags are used in some instances, lamination also produces a very strong, airtight bag. The lamination process, however, is even more costly than silicone coating since it requires the application of a film, which is typically bonded to the fabric with an adhesive and then cured.

There exists a need for a novel air bag fabric which overcomes the aforementioned deficiencies.

SUMMARY OF THE INVENTION

The present invention recognizes and addresses the foregoing disadvantages, and others, of prior art constructions and methods.

Accordingly, it is an object of the present invention to provide motor vehicle air bags made at least in part from novel low permeability fabrics.

Some of these objects are achieved by a vehicle air bag for use with an on-board inflator mechanism. The air bag is formed from a base fabric that has been dipped in an aqueous solution. As a result, a finish is applied to the base fabric to achieve a desired low permeability.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to accompanying figures, in which.

Figure 1:
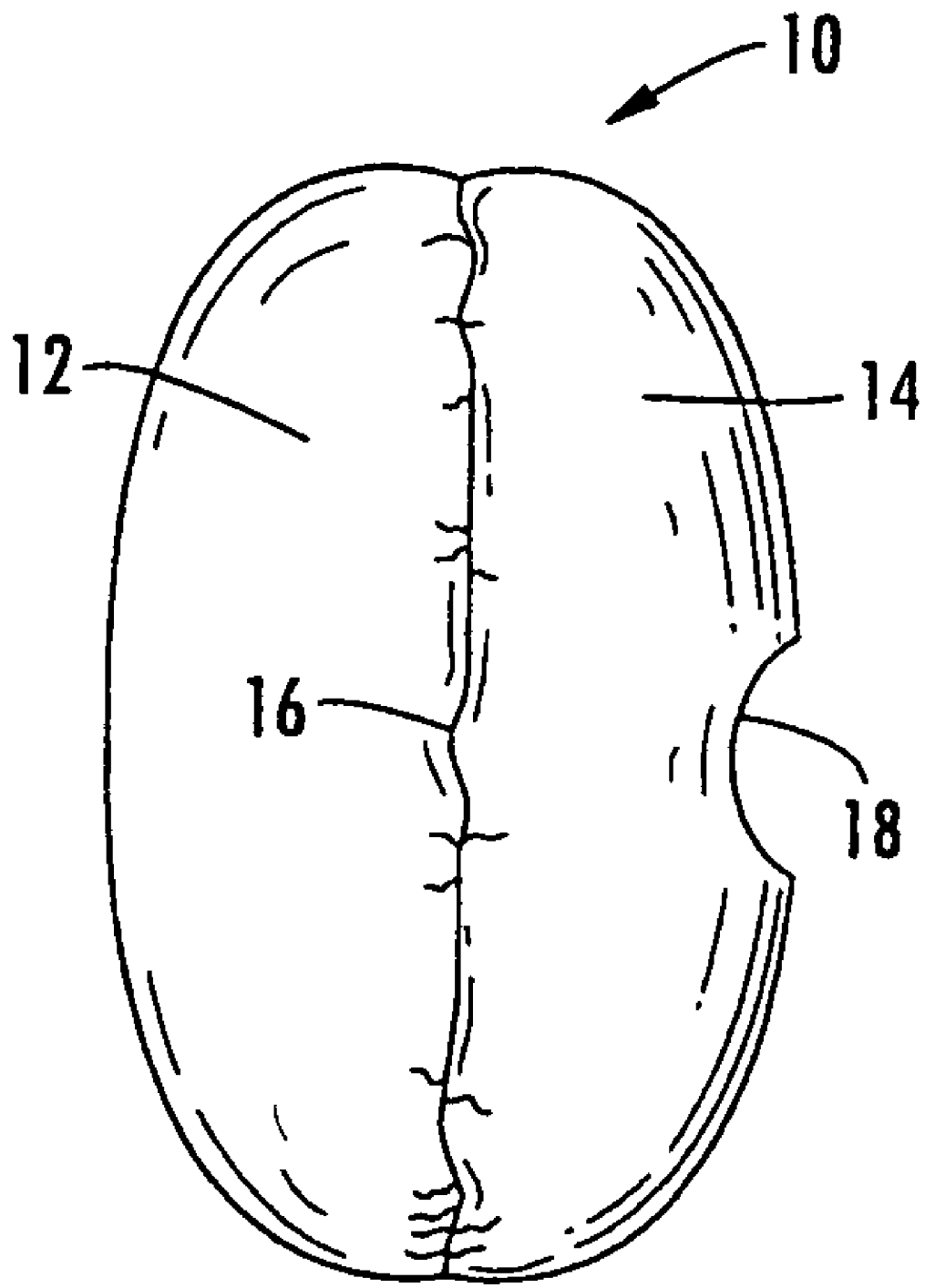
FIG. 1 is a side elevation view of a driver side air bag such as may be produced utilizing fabric of the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a typical driver side air bag 10 that may be constructed of fabric made according to the present invention. Air bag 10 includes a front panel 12 which is attached to a back panel 14 along a seam line 16. Back panel 14 defines an inflator hole 18 to provide fluid communication with a source of inflation gas. It should be appreciated that other types of air bags could also be constructed using the fabric of the present invention, such as passenger side, side cushion and side curtain air bags. Moreover, the present invention could be applied to both cut and sewn air bags or to one-piece-woven air bags (where sewing is not required).

Figure 2:
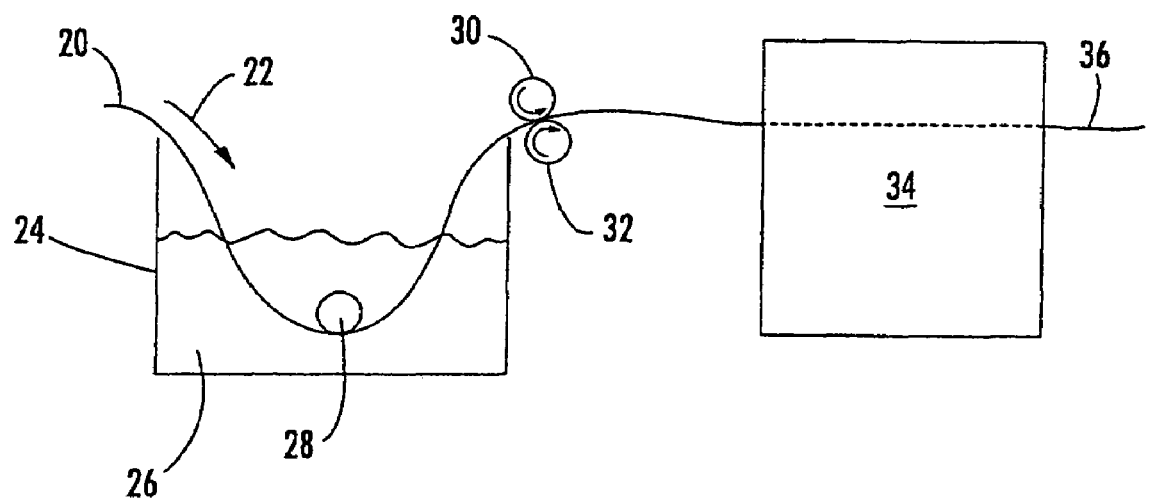
FIG. 2 illustrates a manner of applying a permeability reducing finish to the base fabric.
Figure 3:
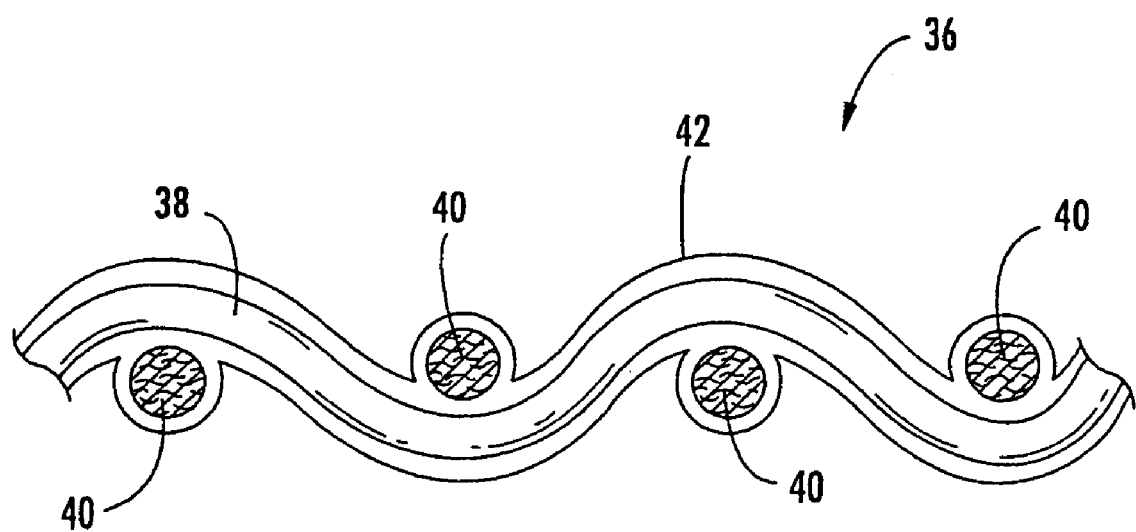
FIG. 3 is an enlarged cross-sectional view of a fabric constructed according to the present invention.
Figure 4:
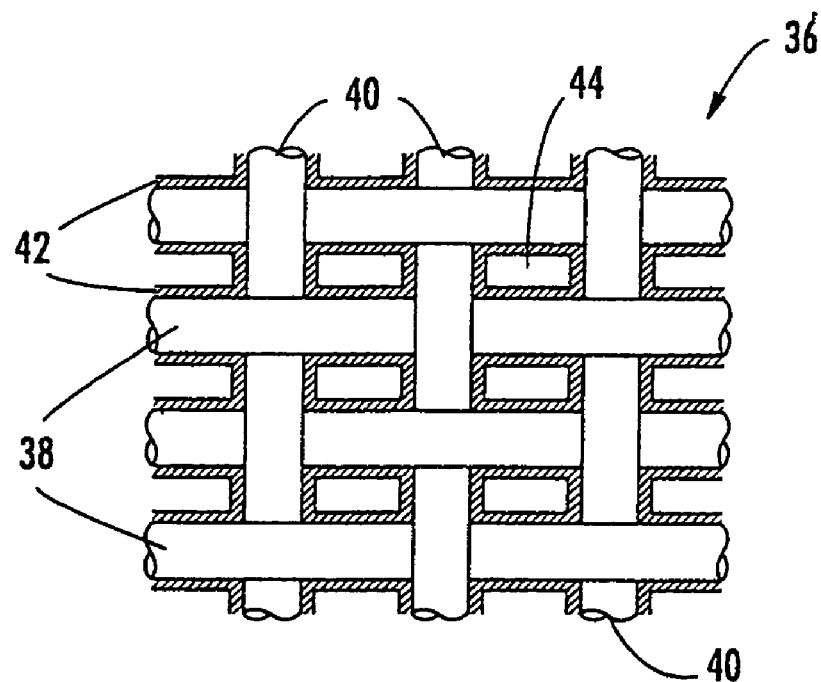
FIG. 4 is an enlarged plan view of the fabric of FIG. 3.

Referring to FIGS. 2, 3 and 4, the fabric of the present invention is constructed from a substrate (or base fabric) 20 that has been dipped in an aqueous solution. Typically, substrate 20 may be woven greige or finished fabric similar to that currently used to produce silicone coated fabric. For example, substrate 20 may be made of synthetic multifilament yarn (such as nylon or polyester) having a size of between 210 denier and 840 denier. Typical fabric constructions are listed in the following Table.

TABLE

| Yarn Size (Denier) | Thread Count Range (Warp and Fill) |
|---|---|
| 210 | 64-74 |
| 315 | 55-65 |
| 420 | 42-52 |
| 525 | 36-46 |

TABLE-continued

| Yarn Size (Denier) | Thread Count Range (Warp and Fill) |
| --- | --- |
| 630 | 33-43 |
| 840 | 15-25 |

As an example, a typical base fabric might have 420 denier nylon yarns woven in a 49×49 plain weave construction.

As shown in FIG. 2, substrate 20 is conveyed (as indicated by arrow 22) through a bath 24 containing an aqueous solution 26. A guide roller 28 may be provided within bath 24 to maintain the full immersion of substrate 20 within the solution. Other systems for dipping substrate in the aqueous solution should be appreciated by those skilled in the art.

Upon exiting solution 26, substrate 20 passes through a nip defined between opposed rollers 30 and 32. The nip serves to push solution 26 well into the interstices of the fabric. Substrate 20, now carrying a quantity of the aqueous solution, is then dried in a tenter oven 34 or other suitable drying device. The water component of the aqueous solution will evaporate in oven 34, leaving a compound on the base fabric in the form of a light finish (or "residue").

Referring now to FIGS. 3 and 4, the resulting fabric can most easily be explained. As can be seen, the fabric 36 of the present invention has warp yarns 38 and fill yarns 40. The residue 42 formed by dipping the base fabric in the aqueous solution adheres to both sides of the base fabric, as well as within its interstices 44. The finish bonds well with the base fabric to become an integral fabric structure.

The permeability of the fabric can be controlled by varying the solution concentration. The solution may be diluted with more water for a lighter residue or may be applied in higher concentrations for heavier coverage. Lower permeability may also be achieved by passing substrate 20 through the solution multiple times. For example, a somewhat diluted solution (e.g., 50% compound/50% $H_2O$) may result in a fabric with a substantially reduced permeability. The permeability may be lowered further by increasing the compound concentration and/or with additional passes such that a completely impermeable fabric may be achieved.

The weight added to the base fabric by the finish will vary. Typically, the weight increase could be from 0.1 to 4 ounces per square yard.

The resulting fabric will generally have at least a 20% improvement in air permeability compared to the untreated fabric. The advantages are that fabrics may be produced with comparable airholding capabilities and performance characteristics to silicone coated fabrics at much lower cost. Moreover, substrate 20 may be formed from fabrics that are traditionally uncoated to help achieve lower permeability while constructing the resulting fabric with less yarn. For example, rather than using a 60×60 uncoated low permeability fabric, substrate 20 may be a 55×55 fabric with an equivalent low permeability achieved through the aqueous dipping process described above.

The solution may be formed from various water-based finishes, such as aliphatic urethanes, acrylics, silicones, flame-retardants and/or blends thereof. The specific chemicals to be used in the solution depends upon the desired characteristics of the resulting fabric. For example, the desired permeability will influence the solution to be used. With respect to desired aging degradation, cross-linking agents could be added having specific tensile properties. Depending upon the desired flammability, a suitable flame retardant could be added to the solution. The stiffness of the resulting fabric could be varied using plasticizer. Moreover, wetting agents may be used to ensure that the base fabric will more evenly absorb the solution.

One product that can be used in the aqueous solution comprises a halogenated polymer wherein the polymer includes, but is not limited to acrylic, acrylic copolymer, polyurethane and polyvinyl acetate; a flame retardant mixture based on phosphorous and sulfur chemistry made durable with methylol condensation product; a plasticizer composed of alkyl phosphate and/or alkyl phthalates of which the alkyl chain range from C3-C10; and a nonionic surfactant with an HLB value of 4-12 acting as a wetting agent.

Another example of a suitable product are film forming rubber polymers resembling pre-vulcanized latex compounds. They are based on an aliphatic urethane formulation which is self cross-linking and air curing/room temperature setting rubber. These products may be combined with water-based pigments or dies for full color saturation. Although naturally resistant to flame, additional flame-retardants may be added to enhance flammability performance as needed.

It can thus be seen that the invention provides an improved fabric for use in a vehicle air bag. Notably, embodiments of the present invention utilize water-based finishes rather than traditional coatings or laminations to achieve desired levels of permeability. The aqueous nature of the solution also eliminates the use of solvents as have often been required for coated fabric.

While presently preferred embodiments of the invention and presently preferred methods of practicing the same have been shown and described, it should be understood that various modifications and variations may be made thereto by those of ordinary skill in the art. In addition, it should be understood that aspects of the various embodiments may be interchanged both in whole or in part. Furthermore, those of ordinary skill in the art will appreciate that the foregoing description is by way of example only and it is not intended to be limitative of the spirit and scope of the invention.

What is claimed is:

1. A vehicle air bag for use with an on-board inflator mechanism, said vehicle air bag having at least one panel of air bag fabric, said fabric comprising:
   a fabric substrate; and
   a residue formed on said fabric substrate by dipping said fabric substrate in an aqueous solution so as to achieve a desired low permeability, the aqueous solution comprising a water-based finish comprising an aliphatic urethane formulation, a flame retardant, or a halogenated polymer, wherein the polymer that is halogenated comprises an acrylic polymer, an acrylic copolymer, a polyurethane, or a polyvinyl acetate.

2. The vehicle air bag as recited in claim 1, wherein said residue bonds with said fabric substrate.

3. The vehicle air bag as recited in claim 1, wherein said fabric substrate is dipped multiple times in said aqueous solution to lower permeability.

4. The vehicle air bag as recited in claim 1, wherein the permeability of said fabric substrate is adjusted by varying the concentration of said aqueous solution.

5. The vehicle air bag as recited in claim 1, wherein said fabric substrate is a multifilament yarn having a size of between 210 and 840 denier.

6. The vehicle air bag as recited in claim 5, wherein said fabric substrate has a size of approximately 210 denier and a thread count range of between 64 and 74.

7. The vehicle air bag as recited in claim 5, wherein said fabric substrate has a size of approximately 315 denier and a thread count range of between 55 and 65.

8. The vehicle air bag as recited in claim 5, wherein said fabric substrate has a size of approximately 420 denier and a thread count range of between 42 and 52.

9. The vehicle air bag as recited in claim 5, wherein said fabric substrate has a size of approximately 525 denier and a thread count range of between 36 and 46.

10. The vehicle air bag as recited in claim 5, wherein said fabric substrate has a size of approximately 630 denier and a thread count range of between 33 and 43.

11. The vehicle air bag as recited in claim 5, wherein said fabric substrate has a size of approximately 840 denier and a thread count range of between 15 and 25.

12. A vehicle air bag for use with an on-board inflator mechanism, said vehicle air bag having at least one panel of air bag fabric, said fabric comprising:
   a fabric substrate; and
   a residue formed on said fabric substrate by application of an aqueous solution to said fabric substrate so as to achieve a desired low permeability, the aqueous solution comprising a water-based finish comprising a halogenated acrylic polymer or copolymer.

13. The vehicle air bag as recited in claim 12, wherein said residue bonds with said fabric substrate.

14. The vehicle air bag as recited in claim 12, wherein the permeability of said fabric substrate is adjusted by varying the concentration of said aqueous solution.

15. The vehicle air bag as recited in claim 12, wherein said fabric substrate comprises multifilament yarns having a size of between 210 and 840 denier.

16. The vehicle air bag as recited in claim 15, wherein said fabric substrate has yarns have a size of approximately 210 denier and a thread count range of between 64 and 74.

17. The vehicle air bag as recited in claim 15, wherein said yarns have a size of approximately 315 denier and a thread count range of between 55 and 65.

18. The vehicle air bag as recited in claim 15, wherein said yarns have a size of approximately 420 denier and a thread count range of between 42 and 52.

19. The vehicle air bag as recited in claim 15, wherein said yarns have a size of approximately 525 denier and a thread count range of between 36 and 46.

20. The vehicle air bag as recited in claim 15, wherein said yarns have a size of approximately 630 denier and a thread count range of between 33 and 43.

21. The vehicle air bag as recited in claim 15, wherein said yarns have a size of approximately 840 denier and a thread count range of between 15 and 25.

22. A vehicle air bag as defined in claim 1, wherein the aqueous solution further comprises a plasticizer.

23. A vehicle air bag as defined in claim 22, wherein the aqueous solution further comprises a surfactant.

24. A vehicle air bag as defined in claim 12, wherein the aqueous solution further comprises a plasticizer.

25. A vehicle air bag as defined in claim 24, wherein the aqueous solution further comprises a surfactant.

26. A vehicle air bag as defined in claim 1, wherein the aqueous solution contains the flame retardant, the flame retardant comprising a phosphorous or sulfur compound.

27. A vehicle air bag as defined in claim 12, wherein the aqueous solution further contains a flame retardant, the flame retardant comprising a phosphorous or sulfur compound.

* * * * *